No. 626,724. Patented June 13, 1899.
M. ROSS.
VEHICLE WHEEL.
(Application filed Oct. 14, 1898.)
(No Model.)
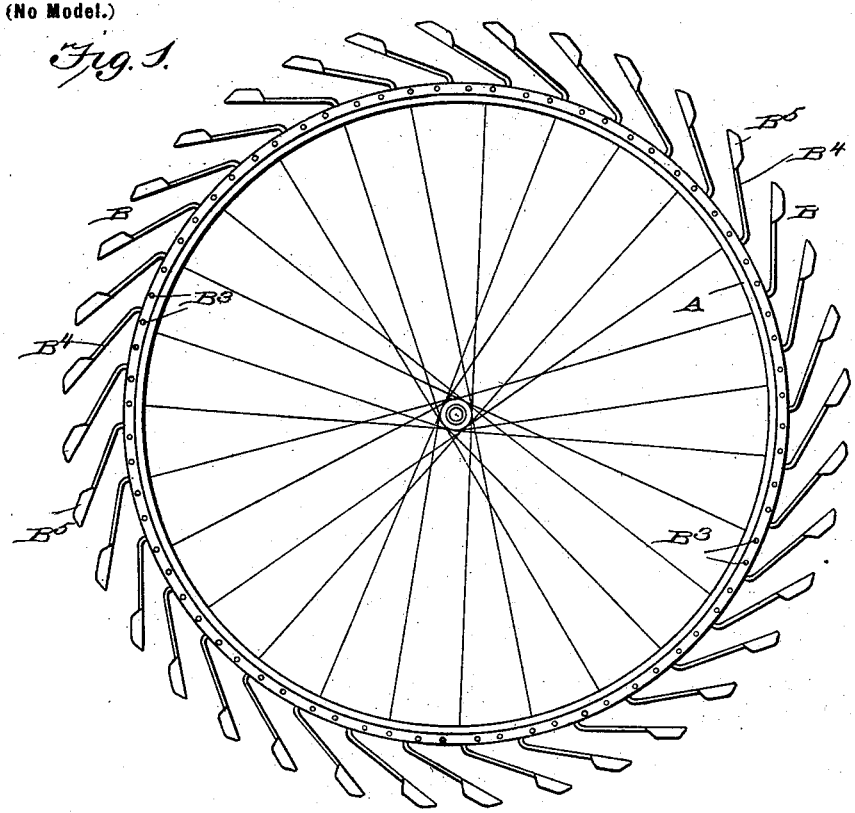
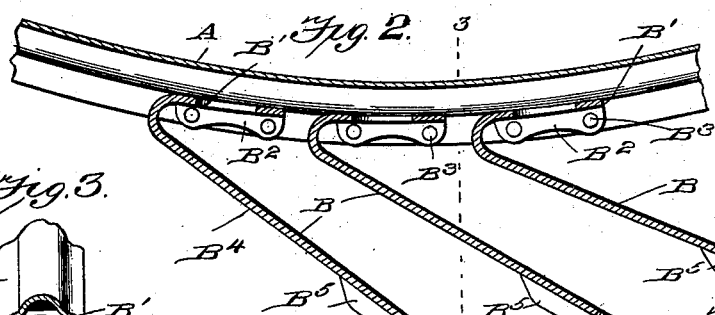
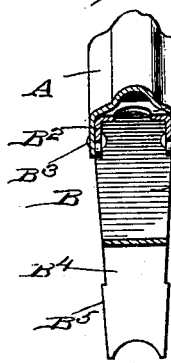
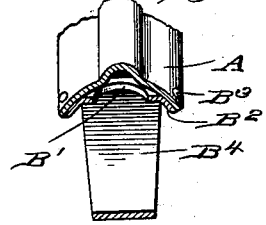
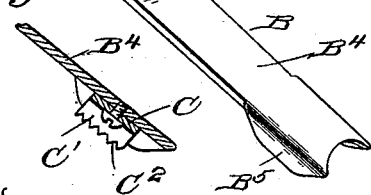
Witnesses
Inventor
Martianus Ross,
by O'Mara
Attorneys

UNITED STATES PATENT OFFICE.

MARTIANUS ROSS, OF CHICAGO, ILLINOIS.

VEHICLE-WHEEL.

SPECIFICATION forming part of Letters Patent No. 626,724, dated June 13, 1899.

Application filed October 14, 1898. Serial No. 693,544. (No model.)

*To all whom it may concern:*

Be it known that I, MARTIANUS ROSS, a citizen of the United States, residing at Chicago, in the county of Cook and State of Illinois, have invented a new and useful Vehicle-Wheel, of which the following is a specification.

This invention relates generally to vehicle-wheels, and more particularly to one intended for use upon bicycles.

The object of the invention is to provide a wheel with an elastic tire or tread which avoids all the objections to the ordinary rubber pneumatic tire, such as puncturing, pumping, &c.

Another object is to provide an elastic tread or tire in which a metallic rim can be used, thereby avoiding the expense of the wooden rim now in general use.

Another object of the invention is to construct the parts so that the wheel can be used upon an ordinary roadway or pavement and also upon ice and snow and in both instances without any danger whatever of slipping.

Another object of the invention is to so construct and arrange the various parts that there will be nothing to work loose, and consequently all rattling avoided.

With these objects in view my invention consists, essentially, in the employment of a metallic rim grooved or flanged in any desirable manner and a series of essentially V-shaped leaf-springs riveted at one end to the inner face of the rim, the opposite end being constructed to contact with the ground; and the invention consists also in constructing the inner end with laterally-projecting ears to provide a means for attaching the springs to the rim and also in constructing the contact end with depending flanges, whereby all slipping is avoided.

The invention consists also in providing a supplemental plate having toothed or serrated flanges, said supplemental plate being adapted to be attached to the contact end of the spring in such a manner as to bring the toothed or serrated flanges into contact with the snow or ice.

The invention consists also in certain details of construction and novelties of combination, all of which will be fully described hereinafter and pointed out in the claims.

In the drawings forming part of this specification, Figure 1 is a side elevation of a wheel constructed in accordance with my invention. Fig. 2 is an enlarged longitudinal sectional detail. Fig. 3 is a section on the line 3 3 of Fig. 2. Fig. 4 is a detail perspective view of one of the leaf-springs. Fig. 5 is a detail view showing it in a modified form, and Fig. 6 is a detail view showing the device constructed for running upon ice.

In carrying out my invention I employ a metallic rim A, which may be slightly grooved or formed with pronounced flanges at the side, as preferred. A series of leaf-springs B are riveted to the metallic rim upon the grooved or flanged side, said leaf-springs being essentially V-shaped, the arm B' being shorter than the other arm and provided with laterally-projecting means $B^2$, which are bent to conform to the grooved or flanged construction of the rim and through which the fastening-rivets $B^3$ are passed, thereby securely fastening the springs to the rim. The longer arm $B^4$ gradually tapers and at its end is formed with depending flanges $B^5$, which contact with the ground, and thereby prevent the wheel slipping in case it leans to one side or the other, as in making a sharp turn. These flanges also prevent the spring proper being unduly worn, and thereby prolong the usefulness of said spring.

A wheel being provided with a tire and spring-tread, substantially as described, it will be understood that as the wheel rolls along; the entire weight will be thrown upon the springs, which are pressed inward to a certain extent, and inasmuch as the weight is borne by at least four springs, it will be seen how the wheel can pass over obstacles, such as sticks, stones, and ruts, without jar, inasmuch as a number of springs are supporting the weight, while the one spring in contact with the obstacle is being unduly compressed. Furthermore, it will be noted that owing to the manner in which the springs are arranged in series the free end of one will act in contact with the intermediate portion of another when pressed inward to any great extent, thereby communicating a portion of the pressure to the second or adjacent spring, and in this manner all danger of breakage is avoided. The depending flanges at the end of the springs prevent the wheels slipping upon the pavement or roadway either in damp weather or in making short turns.

Whenever it is desired to use the wheel upon ice or snow, a supplemental plate C, having depending flanges C', is fastened to the under side of the free end of spring between the depending flanges, the flanges C' of the plate projecting slightly in advance and below the depending flanges of the spring, said flanges C' having teeth or serrations $C^2$, which are adapted to contact with and bite into the ice or snow.

In the drawings I have shown the supplemental plate secured to the springs by means of a small screw passed through the supplemental plate into the end of spring; but it will of course be understood that I do not limit myself to this manner of fastening, as any convenient means of fastening may be employed. By means of the supplemental plates the wheel can be quickly transformed from an ordinary road-wheel into a wheel adapted for use on the ice and snow.

One objection to metal rims heretofore used has been that they were not sufficiently rigid; but in the present instance the rim is made perfectly rigid by the attachment of the plates to the grooved or flanged side thereof, inasmuch as the said grooved or flanged rim is bridged or trussed at definite adjacent points.

It will thus be seen that I provide an exceedingly cheap and simple construction of spring or elastic tread or tire, which will avoid all the objections heretofore raised against pneumatic tires and spring-tires, and it will also be noted that a tire constructed in accordance with my invention can be used upon snow or ice equally as well as upon the ordinary roadway.

Having thus fully described my invention, what I claim as new, and desire to secure by Letters Patent of the United States, is—

1. In a wheel of the kind described, the combination with the metallic rim grooved or flanged as described, of the essentially V-shaped springs having ears at their inner ends adapted to be riveted to the rim, and depending flanges at their free ends adapted to contact with the ground, substantially as shown and described.

2. In a wheel of the kind described, the combination with the metallic rim, of the essentially V-shaped springs having ears at their inner ends adapted to be riveted to the rims, the depending flanges at the free ends of the springs, and the supplementary plates having toothed edges secured to the free end of the plate, substantially as shown and described.

3. In a wheel of the kind described, the combination with the rim and springs constructed and connected as set forth, said springs having depending flanges at their free ends, of the supplementary plates having depending flanges provided with teeth or serrations and means for securing the said supplementary plate to the free end of the spring, substantially as set forth.

MARTIANUS ROSS.

Witnesses:
  CHAS. E. BROCK,
  CLARENCE SHAW.